(12) United States Patent
Morita et al.

(10) Patent No.: US 7,830,570 B2
(45) Date of Patent: Nov. 9, 2010

(54) DEVICE AND METHOD FOR EDITION OF MOVING PICTURE DATA

(75) Inventors: Toru Morita, Tokyo (JP); Munetaka Tsuda, Tokyo (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 1108 days.

(21) Appl. No.: 10/931,417

(22) Filed: Sep. 1, 2004

(65) Prior Publication Data

US 2005/0235335 A1    Oct. 20, 2005

(30) Foreign Application Priority Data

Sep. 2, 2003    (JP)    ............................... 2003-309471

(51) Int. Cl.
  H04N 1/04 (2006.01)
  H04N 1/46 (2006.01)
  G06F 3/00 (2006.01)
(52) U.S. Cl. ........................ 358/537; 358/479; 715/716; 715/719
(58) Field of Classification Search ................. 358/479, 358/537, 540, 1.9; 382/305; 715/716, 251, 715/255, 201, 717, 719, 721, 723; 386/55; G06F 17/30; G11B 27/34, 27/28
See application file for complete search history.

(56) References Cited

U.S. PATENT DOCUMENTS

| | | | |
|---|---|---|---|
| 5,442,744 A | 8/1995 | Piech et al. | |
| 5,732,184 A | 3/1998 | Chao et al. | |
| 5,935,004 A * | 8/1999 | Tarr et al. | ...................... 463/40 |
| 6,192,183 B1 * | 2/2001 | Taniguchi et al. | ............. 386/52 |
| 6,400,378 B1 * | 6/2002 | Snook | .......................... 715/716 |
| 6,912,327 B1 * | 6/2005 | Hori et al. | .................... 382/305 |
| 7,272,295 B1 * | 9/2007 | Christopher | .................. 386/46 |

FOREIGN PATENT DOCUMENTS

| | | | |
|---|---|---|---|
| EP | 0 782 085 A1 * | 7/1997 | |
| EP | 1 047 074 | 10/2000 | |
| EP | 1 193 713 | 4/2002 | |
| JP | 11-146336 | 5/1999 | |

OTHER PUBLICATIONS

Patent Abstracts of Japan, Publication No. 11146336; Publication Date May 28, 1999.

* cited by examiner

*Primary Examiner*—James A Thompson
(74) *Attorney, Agent, or Firm*—Frommer Lawrence & Haug LLP; William S. Frommer; Ellen Marcie Emas

(57) ABSTRACT

When a predetermined operation is made of a remote commander while moving picture data read from a storage unit and decoded is being displayed on a display screen, a thumbnail of a reproduced image being displayed on the display screen and a plurality of thumbnails near the reproduced image displayed on the display screen are displayed being superposed on the reproduced image. Information on edit points indicating the position of image data corresponding to ones, designated by the remote commander, of the plurality of thumbnails displayed on the display screen is added to the moving picture data, and the data is stored into the storage unit. Thus, it is possible to set IN and OUT points as edit points elaborately and easily for edition of moving picture data.

31 Claims, 6 Drawing Sheets

DEVICE AND METHOD FOR EDITION OF MOVING PICTURE DATA

BACKGROUND OF THE INVENTION

1. Field of the Invention

The present invention relates to a moving picture data editing device and device suitably usable for setting and editing a start point and end point of a portion, not to be replayed, of moving picture data stored in a hard disk or digital versatile disk (DVD), for example, and more particularly, to a user interface technique for the edition.

This application claims the priority of the Japanese Patent Application No. 2003-309471 filed on Sep. 2, 2003, the entirety of which is incorporated by reference herein.

2. Description of the Related Art

It has been proposed to designate and edit only a portion, the user wants to replay for viewing and listening, of moving picture data of a broadcast program, for example, recorded and stored once in a hard disk drive or the like (cf. Japanese Published Unexamined Patent Application No. 146336 of 1999).

The above edition is implemented by reading moving picture data once stored in a hard disk drive or the like and reproducing the data in an edit mode, viewing the reproduced picture data, designating a start point and end point of a portion of the picture over which it is desired to skip at the time of replay, adding information on the designated start and end points of the picture portion to the moving picture data, and writing the data back to the hard disk drive.

According to the DVD-Video Recording (DVD-VR) format standard, the information on the start and end points of the picture portion over which it is desired to skip can be recorded as additional data to the moving picture data. It is possible to record a plurality of pairs of a start point (IN point) and end point (OUT point) of the picture portion per content additionally to the moving picture data to be recorded.

Note here that the IN and OUT points are conventionally set as edit points in the edit mode by repeating operation of a play button or search button, pausing operation and operations for setting the IN or OUT point while watching a reproduced picture being displayed on a monitor screen.

With the conventional technique for locating edit points for a desired portion of a moving picture being displayed by pressing a pause button while watching only the monitor screen, it is extremely difficult to set edit points elaborately. That is, to set edit points elaborately with the conventional technique, it is necessary to position desired edit points by repeatedly operating the play button, search button and pause button if the desired portion of the moving picture could not be stopped exactly between the desired edit points set by pressing the pause button. This is very troublesome.

Also, edit points having thus been set cannot actually be any desired ones.

OBJECT AND SUMMARY OF THE INVENTION

It is therefore an object of the present invention to overcome the above-mentioned drawbacks of the related art by providing a moving-picture data editing device and method, by which the IN and OUT points as edit points can be set elaborately and easily.

The above object can be attained by providing a moving picture data editor including a command input unit that accepts an operation command entered by the user; a storage unit that stores moving picture data; a decoder for decoding the moving picture data read from the storage unit into display image data; a thumbnail generator for generating a thumbnail of a portion, appearing at every predetermined time, of an image formed from the moving picture data; a display image generation/output unit that outputs the display image data from the decoder to a display unit, and reproduces the image on the latter, and generates image data so that a thumbnail of the reproduced image being displayed on the screen of the display unit and a plurality of thumbnails near the reproduced image are displayed being superposed on the reproduced image when a predetermined operation is made of the command input unit and outputs the image data to the display unit; and a unit for adding, to the moving picture data, information on edit points indicating image data positions corresponding to ones, designated by the command input unit, of the plurality of thumbnails displayed on the screen of the display unit, and storing the data into the storage unit.

In the moving picture data editing device, when the predetermined operation is made of the command input unit, the thumbnail of the reproduced image being displayed on the display screen and the plurality of thumbnails near the reproduced image are displayed being superposed on the reproduced image.

Therefore, when a pause button is operated, for example, not only the image being displayed but the images near that image are provided as thumbnails to the user. The user can designate the thumbnails displayed being superposed as edit points and take the image data positions corresponding to the thumbnails as information on edit points.

Thus, by making a predetermined operation, for example, pressing the pause button, when finding a desired portion of an image being displayed, the user can set positions near the desired image portion as edit points, and thus can set edit points elaborately and easily.

In the moving picture data editing device, before stored in the storage unit, the moving picture data has been subjected to motion compensation and divided into image groups each of a plurality of images and at least one image in one image group has been compressed with an image compression technique of providing a complete image in one screen, and the thumbnail generator generates the thumbnail by minifying the image, compressed with the image compression technique of providing the complete image in one screen, in each image group of the compressed moving picture data.

According to the present invention, the minified image displayed as a thumbnail is the minimum unit of an image reproducible without decoding all the moving picture data compressed with an adopted image compression technique, a thumbnail can rapidly be generated and edit points can be set elaborately and easily.

The present invention provides a moving picture data editing device and method, capable of setting IN and OUT points as edit points elaborately and easily.

These objects and other objects, features and advantages of the present invention will become more apparent from the following detailed description of the preferred embodiments of the present invention when taken in conjunction with the accompanying drawings.

DETAILED DESCRIPTION OF THE PREFERRED EMBODIMENTS

The present invention will be described in detail concerning embodiments of the moving picture data editing device and method according to the present invention.

In the embodiments which will be illustrated and described below, the present invention is applied to a moving picture data edition in the multimedia playback which reproduces a plurality of contents from a plurality of medium types such as broadcasting, recording medium such as an optical disk, video game machine, etc.

Note that in the following description, the "content" means information the human can recognize visually and aurally, such as audio data such as music, images such as moving and still pictures, text data such as electronic novels, game programs or the like.

Also, the "medium" means an information storage medium such as a hard disk, optical disk, memory card, magnetic tape or the like, and an information transmission medium such as wave, cable or the like. However, a storage medium such as a game program medium or a transmission medium, of which the data format and compression format are different from the "medium" is differentiated from the "medium".

<Construction of Multimedia Recording/Playback System>

Figure 1:
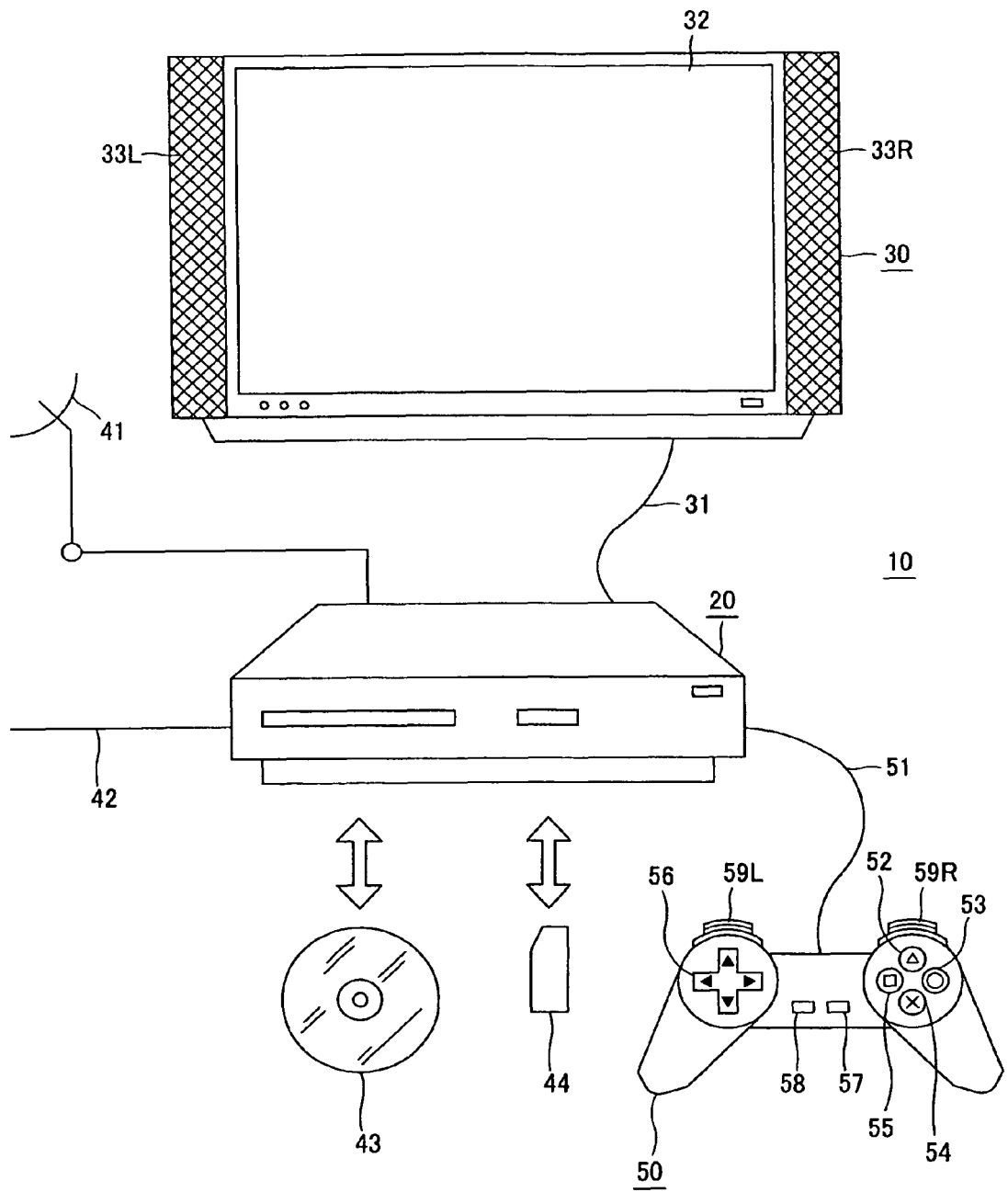
FIG. 1 schematically illustrates a constructional example of the multimedia system including the an embodiment of the moving picture data editor according to the present invention.

Referring now to FIG. 1, there is schematically illustrated the basic construction of a multimedia recording/playback system. As shown, the multimedia recording/playback system, generally indicated with a reference 10, includes a multimedia recorder/player 20 to which the present invention is applied.

In this embodiment, the multimedia recorder/player 20 does not includes any display on which an image and graphic user interface screen are displayed but includes a video output terminal (not shown) instead. The video output terminal is connected to a monitor display 30 which is a CRT (cathode-ray tube) or LCD (liquid crystal display), for example, by a video output terminal connecting cable 31 of the multimedia recorder/player 20, and the monitor display 30 has a screen 32 which displays an image and graphic user interface screen.

Note that in the embodiment in FIG. 1, the monitor display 30 has speakers 33L and 33R provided at the opposite ends thereof and which are supplied with an audio signal from an audio output terminal (not shown) of the multimedia recorder/player 20 via a cable (not shown) and reproduce the audio signal acoustically.

The multimedia recorder/player 20 is supplied with content information via various types of media such as broadcasting, Internet, optical disk such as DVD, CD (compact disk) or the like, memory card, etc.

The broadcasting medium will be described below. In this embodiment, a TV broadcast reception antenna 41 is connected to the multimedia recorder/recorder 20 which will thus be supplied with a TV broadcast signal received by the reception antenna 41. Then, in the multimedia recorder/player 20, a broadcast program content selected by the user is extracted from the TV broadcast signal, decoded, and a broadcast program image thus formed is displayed on the screen of the monitor display 30 while a sound of the broadcast program is acoustically reproduced by the speakers 33L and 33R of the monitor display 30. Also, the multimedia recorder/player 20 has also a function to record the broadcast program content.

Next, the Internet medium will be described. The multimedia recorder/player 20 has connected thereto a communication (telephone) line 42 which connects the multimedia recorder/player 20 to the Internet, and web content data acquired via the Internet is supplied to the multimedia recorder/player 20. The web content data can be stored in the multimedia recorder/player 20 and also utilized with various functions such as a game program function provided in the multimedia recorder/player 20.

Further, the optical disk medium will be described. The multimedia recorder/player 20 has a function to read data in a content stored in an optical disk 43 such as DVD, CD or the like, decodes the data thus read and supplies the data to the monitor display 30 on which the data is displayed as an image and from which it is provided as a sound. Also, the multimedia recorder/player 20 has also a function to store moving picture data and audio data in the video content read from a DVD, and music content data read from a CD.

An optical disk can store contents including, for example, images, music and sound in a movie, music sounds such as classical music, popular songs and the like, electronic novel, etc. Data in an electronic novel as a content include text data, audio data for recitation, image data such as book illustrations, etc.

The memory card will be described. The multimedia recorder/player 20 has a function to read, and a function to write, data stored in a memory card 44. The memory card 44 can store content data including a captured image such as a moving picture or still picture captured by a digital camera, sound information incidental to the captured image, etc. These data can be stored in a data storage unit provided in the multimedia recorder/player 20.

In this embodiment, the multimedia recorder/player 20 has a video game function. The multimedia recorder/player 20 has connected thereto by an interconnecting cable 51 a command input unit (will be referred to as "remote commander" hereunder) 50 as a video game controller. According to this embodiment, since the remote commander 50 is intended primarily for use as the video game controller, so it has a relatively small number of control buttons. In the embodiment shown in FIG. 1, the remote commander 50 has four control buttons 52, 53, 54 and 55 provided at the respective apexes of an imaginary rhombus, cross-shaped directional button 56 having directional arrows, start button 57, select button 58, and an L-button 59L and R-button 59R provided at the lateral side of the remote commander 50.

The four control buttons 52, 53, 54 and 55 have provided on their tops, respectively, by printing or the like, special markings like small circle, triangle, square and cross in this embodiment as shown in FIG. 1. As will further be described later, four control buttons 52, 53, 54 and 55, start button 57 and select button 58 are pre-correlated with predetermined control items in a graphic user interface displayed on the screen of the monitor display 30.

Since the same markings as those provided on the tops of the control buttons 52, 53, 54 and 55 are added to the respective control items on the graphic user interface on the display screen, so the user will know the correspondence between the control buttons and control items at a glance.

When the user operates one of the control buttons on the remote commander 50 while the graphic user interface is being displayed on the screen of the monitor display 30, the graphic user interface screen will reflect the operation of that control button. The remote commander 50 is designed as a part of the multimedia recorder/player 20.

<Construction of Multimedia Recorder/Player 20>

Figure 2:
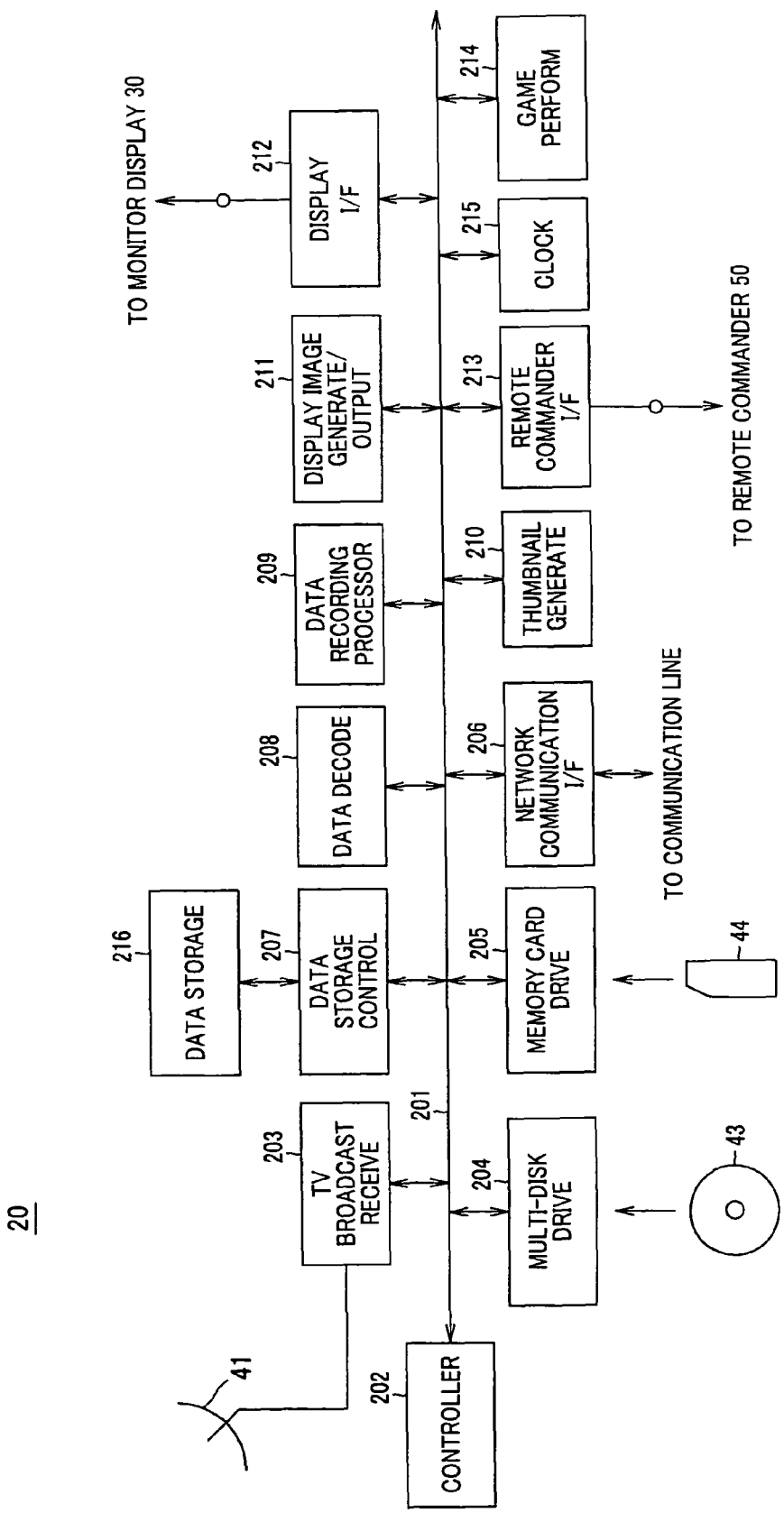
FIG. 2 is a schematic block diagram of the substantial portion of the embodiment of the moving picture data editor according to the present invention, showing a constructional example.

FIG. 2 shows the hardware construction of the multimedia recorder/player 20 as an embodiment of the moving picture data editor according to this embodiment.

As shown in FIG. 2, the multimedia recorder/player 20 according to this embodiment includes a system bus 201 to which there are connected a controller 202, TV broadcast receiver 203, multi-disk drive 204, memory card drive 205, network communication interface 206, data storage controller 207, data decoder 208, data-recording processor 209, thumbnail generator 210, display image generation/output unit 211, display interface 212, remote commander interface 213, game performer 214 and a clock 215.

The controller 202 includes a CPU (central processing unit), program ROM (read-only memory), work area RAM (random-access memory), etc. Using the work area RAM according to a program written in the program ROM, the controller 202 performs a variety of control operations.

The TV broadcast receiver 203 selects a broadcast program corresponding to a user-selected channel supplied via a remote controller or remote commander (not shown) from TV signals received by the antenna 41, and sends it to the system bus 201.

The multi-disk drive 204 reads content data from the optical disk 43 such as a DVD, CD or the like set therein and takes it into the multimedia recorder/player 20. Also, in case the multi-disk drive 204 can write data to a DVD, when a write command is supplied from the controller 202, the multi-disk drive 204 can write data to the DVD.

The memory card driver 205 reads data from the memory card 44 set therein, and also writes data from the multimedia recorder/player 20 to the memory card 44.

The network communication interface 206 is connected to the communication line 42 as mentioned above. It is used to download data such as web content via the Internet and also upload predetermined information via the Internet during Internet video game.

The data storage controller 207 has connected thereto a data storage unit 216 including a hard disk drive, for example. The data storage controller 207 controls data write to, and data read from, the data storage unit 216.

Based on a user's command accepted via the remote commander 50, the data decoder 208 decodes coded broadcast content data read from the TV broadcast receiver 203, multi-disk drive 204 or data storage unit 216 or coded data such as a movie or music read from a DVD or CD, and sends the data to the system bus 201. The controller 202 stores the decoded video data, music data or the like to an output buffer of the display image generation/output unit 211.

Under the control of the controller 202, the data-recording processor 209 converts, based on a user's command entered from the remote commander 50 operated by the user, coded broadcast content data from the TV broadcast receiver 203, coded data such as movie or music read from the multi-disk drive 204 or web content downloaded via the network communication interface 206 into a format for recording to the data storage unit 216, and stores the formatted data into the data storage unit 216 via the data storage controller 207. In this embodiment, the DVD-VR format is used as the recording format.

In this embodiment, the thumbnail generator 210 generates a thumbnail as a minified image of a frame image from moving picture data read from the data storage unit 216. In this embodiment, moving picture data is compressed with the MPEG (Moving Picture Experts Group) coding compression technique using the motion compensation inter-frame coding.

In the coding compression technique, moving picture data is grouped in units of a plurality of frames, for example, at every 15 frames. The frame image grouping unit is called "GOP (Group of Pictures). Each GOP includes a frame compressed with a compression technique completed within one screen (intra-frame picture, called "I picture"). Other frame image than the I picture will be compressed by the motion compensation inter-frame coding. When one or both of frame images before and after the other frame image is not reproduced after decoded, the other frame image can be reproduced by decoding.

Therefore, a frame image intended to form a thumbnail and which is other than an I picture can be produced only after frame images before and after the frame image in question are reproduced.

Since an I picture has been intra-frame coded, so image data can be reproduced only from I-picture data. Therefore, a thumbnail can be generated from the I picture without waiting for reproduction of frame images before and after the I picture. Since it is not necessary to decode the preceding and next frame images, so the I picture can be reproduced rapidly and thus a thumbnail can also be generated rapidly.

The display image generation/output unit 211 stores decoded video data or music data supplied from the data decoder 208 into an output buffer incorporated therein. Also, it stores thumbnail data from the thumbnail generator 210, data indicating characters, symbols, etc. for display on the graphic user interface screen, etc. as on-screen display data into an on-screen buffer incorporated therein. The on-screen display data is displayed being superposed on an reproduced image displayed on the monitor display 30. At this time, the reproduced image is displayed to be transparent through the overlying image.

Further, the display image generation/output unit 211 supplies data synthesized by combining the data stored in the output buffer and on-screen display data stored in the on-screen buffer to the monitor display 30 via the display interface 212 connected to the monitor display 30 via the cable 31.

Also, when a game is performed in the game performer 214, the display image generation/output unit 211 cooperates with the game performer 214 to generate game image information, and supplies the game drawing image thus generated to the monitor display 30 via the display interface 212.

The game performer 214 executes a game program read from the optical disk 43 by the multi-disk driver 204 or game program read from the data storage unit 216. The game performer 214 is based on a user's command accepted by the remote commander 50 to perform a game program, and sends game video and audio data to the display image generation/output unit 211.

The remote commander interface 213 has a game controller as the remote commander 50 connected thereto via the cable 51. As having previously been described, the remote commander 50 includes the cross-shaped directional button 56 which accepts user's operations as commands for four directions (upward, downward, leftward and rightward), four control buttons 52, 53, 54 and 55 and control buttons 57 and 58 which accept user's operations as commands for content replay, replay stop, menu screen call, etc., respectively.

A control signal entered by operating any one of these control buttons on the remote commander 50 is supplied from the remote commander 50 to the system bus 201 via the remote commander interface 213. The controller 202 provides a control corresponding to the control signal.

The clock 215 provides current-time information and calendar information. Also, the clock 215 is used to measure various kinds of time. Further, when a video content is recorded, the clock 215 provides time information for addition to the recorded data. The time information for addition to the recorded data is such that there can be known a temporal position of each of various image frames of a video content in relation to the beginning of the video content. The time information may be a current time or a time relative to the beginning of a content.

When the user has set a mode for reception of a TV broadcast, the controller 202 transfers data from the TV broadcast receiver 203 to the data decoder 208, and the data decoder 208 decodes the coded video and audio data for supply to the monitor display 30 via the display image generation/output unit 211 and display interface 212.

Also, when the user has set a mode for replay of a DVD, the controller 202 transfers video content data and audio data from a DVD in the multi-disk drive 204 to the data decoder 208, and the data decoder 208 decodes the coded audio and video data for supply to the monitor display 30 via the display image generation/output unit 211 and display interface 212.

When the user has set a mode for storage of broadcast or DVD content, the controller 202 has the data-recording processor 209 convert the coded data from the TV broadcast receiver 203 or the video content data and audio data from the DVD in the multi-disk driver 204 into a format for recording to the data storage unit 216, and has the data storage controller 207 store the data thus formatted into the data storage unit 216.

Also, the controller 202 provides a control to display, on the display screen 32 of the monitor display 30, data read from the memory card 44 or web content data downloaded via the network communication interface 206 or store the data into the data storage unit 216 according to a user-et mode entered from the remote commander 50 operated by the user.

Also, in this embodiment, the controller 202 operates to have the user set IN and OUT points of an image portion which is not to be reproduced in the edit mode as will be described below.

Note that the data decoder 208, data-recording processor 209, thumbnail generator 210 and display image generation/output unit 211 shown in FIG. 2 may be formed from software.

<Operations for Edition>

In this embodiment, the multimedia recorder/player 20 can select an item "edit" from the manipulating-function menu, and set, in this edit mode, IN and OUT points of a portion, not to be reproduced, of an image being reproduced.

When the start button 57 on the remote commander 50 is pressed, one of a plurality of media (not shown) is selected, and an initial menu screen for selection of a user-desired content from a plurality of contents in the selected medium is generated by the display image generation/output unit 211 and displayed on the display screen 32 of the monitor display 30. At this time, the initial menu screen is displayed being superposed on a content being reproduced, if any.

By operating the cross-shaped directional button 56 at the remote commander 50, the user can select a desired medium and content on the initial menu screen.

After selecting a medium and content, the user pushes the control button 53, for example. Then, for the selected content, a manipulating-function menu screen carrying possible manipulating-function items is generated by the display image generation/output unit 211, replaces the initial menu screen, and displayed on the display screen 32 of the monitor display 30.

Watching the manipulating-function menu screen and operating the cross-shaped directional button 56, the user selects a desired manipulating-function item. The user can select "edit" as a manipulating-function item. Then, the display image generation/output unit 211 generates an edition items list menu which will be displayed on the display screen 32 of the monitor display 30.

Then, the user operates the cross-shaped direction button 56 on the remote commander 50, selects "Video-Edit" as one of the edition items, and presses the control button 53 (as an enter key) on the remote commander 50. In this embodiment, the "Video-Edit" is to set IN and OUT points of an image portion which is not to be reproduced.

When the "Video-Edit" item is selected and set by pressing the control button 53, reproduction of the selected content starts, and a reproduced image is displayed on the display screen 32 of the monitor display 30. At this time, a thumbnail array 300 in which a plurality of thumbnails is arranged in a horizontal array is displayed being superposed on the reproduced image as shown in FIG. 3.

The thumbnail array 300 displayed during replay includes a horizontal nearly central area 301 and a left area 302 extending leftward from the central area 301. The central area 301 shows a thumbnail of an image being currently displayed, and the left area 302 shows a plurality of thumbnails of earlier image frames of the image being currently displayed. Each thumbnail is a minified image of I picture in each GOP as having previously been described. When GOP is composed of five frames, for example, the thumbnails are images of a content, taken at intervals of 0.5 sec.

Figure 3:
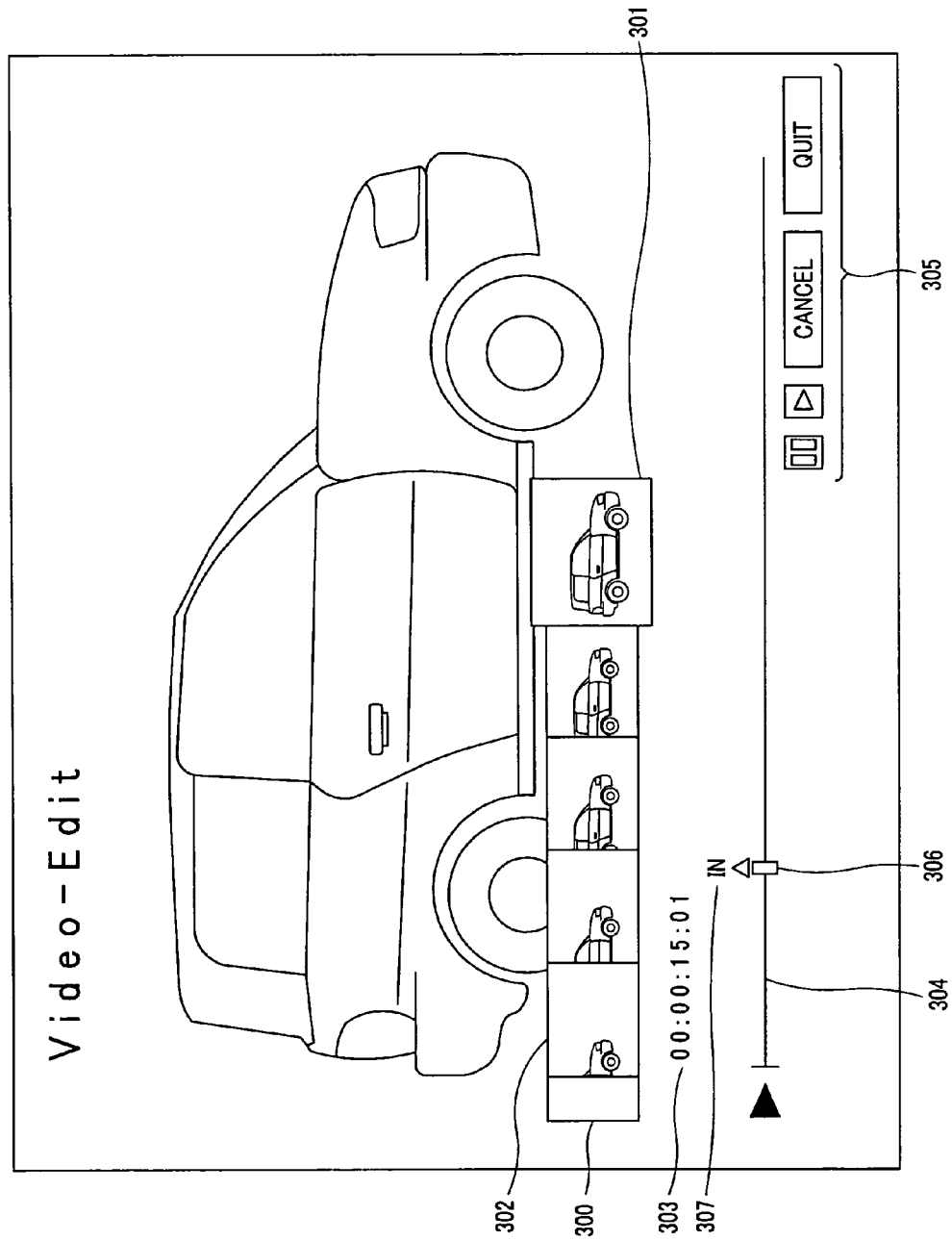
FIG. 3 shows an example of the initial menu screen of the replay-edit menu screen in the embodiment of the moving picture data editor according to the present invention.

In this embodiment, the thumbnail in the central area 301 is displayed to be larger for emphasis than the thumbnails in the other area as shown in FIG. 3. Thus, the user can know at a glance a thumbnail being currently reproduced. It should be noted that the thumbnail in the central area 301 can also be emphasized by changing the surrounding color, not by changing the display size. Also it should be noted that the emphasized display is not indispensable.

Also, in this embodiment, there are displayed below the thumbnail array 300 numerals 303 indicating a time, of an image being currently displayed, from the beginning of a content, a time bar indication 304 indicating a time zone of the entire time of reproduction of the content, where the image being currently displayed was, and operation symbols 305 indicative of possible operations on the screen, as shown in FIG. 3. The operation symbols 305 include "CANCEL" which will cancel settings of edit points when the symbol is touched or when a button having this function assigned thereto is pressed, and "QUIT" which will terminate the replay-edit mode for setting edit points when the symbol is touched or when a button having this function assigned thereto is pressed.

Along the time bar 304, there is displayed a bright spot 306 indicating the position of an image being currently displayed. Above the bright spot 306, there are displayed characters 307 indicating an IN or OUT point to be set next.

Figure 4:
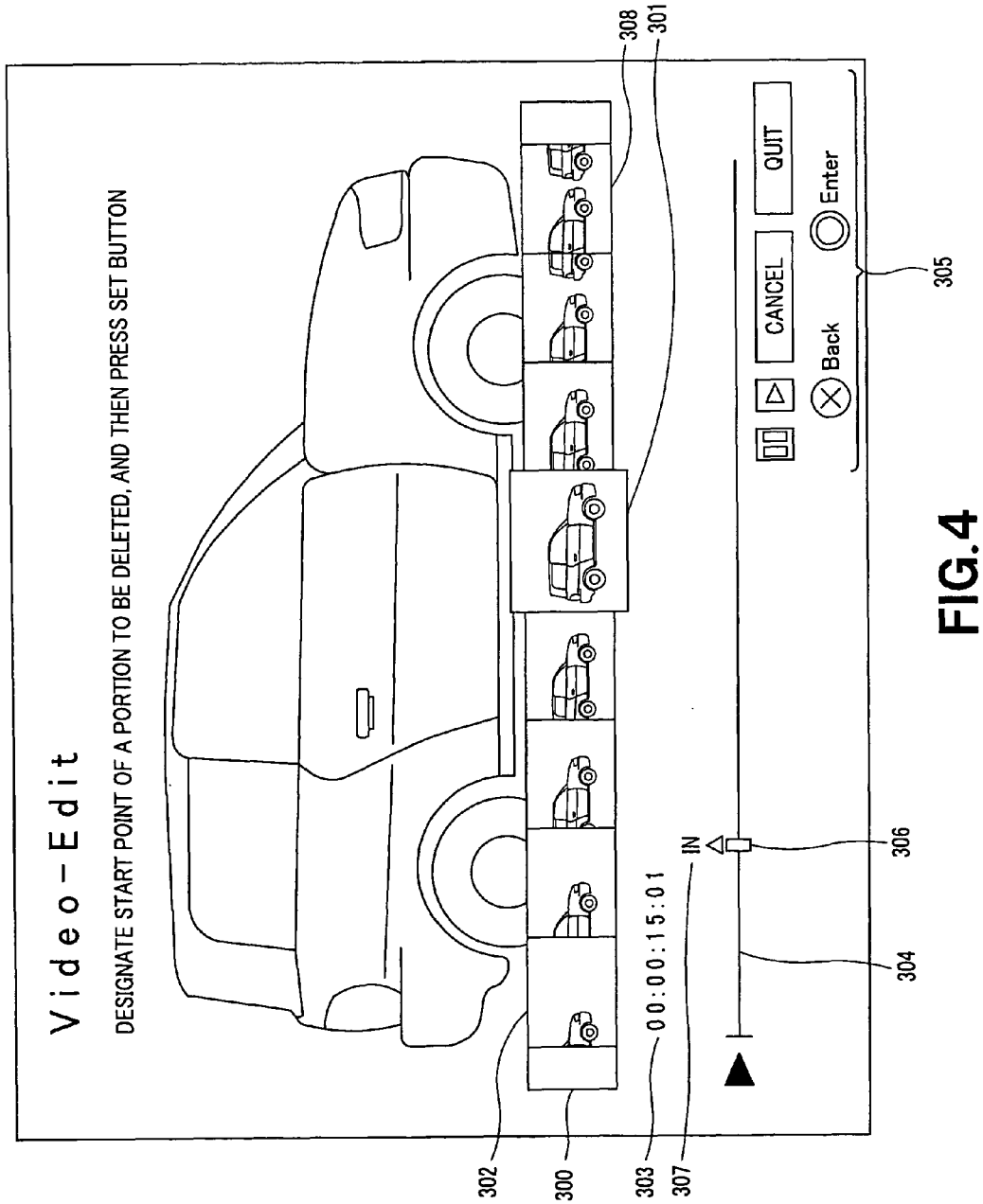
FIG. 4 explains the edit-point setting user interface screen of the replay-edit menu screen in the embodiment of the moving picture data editor according to the present invention.

In this embodiment, during the replay for which an image is displayed as shown in FIG. 3, when an operation corresponding to a pause button (e.g., control button 55) is made at the remote commander 50, the produced image being displayed on the display screen 32 is temporarily stopped, and there is displayed an edit-point setting user interface screen on which IN and OUT points are to be set, as shown in FIG. 4.

The edit-point setting user interface screen is generated by the display image generation/output unit 211 and thumbnail generator 210 under the control of the controller 202, and displayed on the display screen 32 of the monitor screen 30.

On the edit-point setting user interface screen, the thumbnail array 300 includes the horizontal nearly central area 301, left area 302 extending leftward from the central area 301, and also a right area 308 extending rightward from the central area 301.

Just after the pause button is operated, a thumbnail of an image being currently displayed is displayed in the central area 301, a plurality of thumbnails of earlier image frames than the image being currently displayed is displayed in the left area 302, and a plurality of thumbnails of later image frames than the image being currently displayed is displayed in the right area 308.

The operation symbols 305 include characters "Enter" with a double circle corresponding to a double circle marked on the top of the control button 53 on the remote commander 50 and "Back" with a cross corresponding a cross marked on the top of the control button 54 in addition to the buttons "CANCEL" and "QUIT".

The numerals 303 indicating a time, from the beginning of a content, of an image being currently displayed, and time bar 304 are displayed similarly to those in FIG. 3. Further, a message for prompting the user to set edit points is displayed in the upper portion of the edit-point setting user interface screen as shown in FIG. 4. The message includes a phase indicting whether a next edit point to be set is an IN point (start position of a portion to be deleted) or an OUT point (end position of the portion to be deleted) to call the user's attention.

On the edit-point setting user interface screen, a thumbnail in the central area 301 of thumbnail array 300 is a thumbnail in a position of an image, being selected as an edit point (will be referred to as "thumbnail of interest" hereunder). In this embodiment, when a leftward-direction command is entered by the user operating the remote commander 50, the thumbnail array 300 is scrolled in a direction toward the past, and when a rightward-direction command is entered similarly by the user operating the remote commander 50, the thumbnail array 300 is scrolled in a direction toward the future.

In this case, the scroll speed is variable. Namely, when the cross-shaped directional button 56 on the remote commander 50 is pressed at the leftward-direction portion thereof, each thumbnail of interest in the thumbnail array 300 is scrolled in the direction toward the past. On the contrary, when the cross-shaped directional button 56 is pressed at the rightward-direction portion thereof, each thumbnail of interest in the thumbnail array 300 is scrolled in the direction toward the future.

Also, when the L-button 59L is operated at the remote commander 50, thumbnails of interest in the thumbnail array 300 are discretely scrolled at every 10 pieces, for example, in the direction toward the past. On the contrary, when the R-button 59R is operated at the remote controller 50, thumbnails of interest in the thumbnail array 300 are discretely scrolled at every 10 pieces, for example, in the direction toward the future.

Then, when the control button 53 as an enter button on the remote commander 50 is pressed, an image position corresponding to a thumbnail of interest displayed in the central area at that time is set as an edit point.

After setting the edit points, the user will make an operation to resume the replay. The replay is thus resumed, and the replay screen in the edition mode in FIG. 3 reappears. When the pause button is operated again, the aforementioned edit-point setting user interface screen shown in FIG. 4 will appear for setting an OUT point if an IN point has been set with the previous setting operation or an IN point if an OUT point has been set with the previous setting operation.

Note that since the screen shown in FIG. 4 is a screen for setting an IN point, so the message displayed in the upper portion of the screen includes a phase for prompting the user to set a start position of an image portion to be deleted and the time bar 304 includes "IN" indicating an edition of an IN point. However, in case the screen shown in FIG. 4 is a screen for setting an OUT point, the message will include a phrase for prompting the user to set an end position of the image portion to be deleted, and the timer bar 304 include also "OUT" indicating an edition of an OUT point.

As above, upon completion of the edition with an IN or OUT point set alternately for a content to be edited, information on these edit points will be recorded as IN or OUT point in data in the video content in consideration.

When a content thus edited and stored in the data storage unit is reproduced based on the edit points, the content will be reproduced with skip over a portion of the video content between the IN and OUT points. Also, when a recording mode using edit points is set for copying such a content to a writable DVD, for example, the content will be copied with omission of the portion between the IN and OUT points.

Next, the aforementioned operations of the multimedia recorder/player 20 according to the present invention in the replay-edit mode will be described in detail with reference to FIGS. 5 and 6. Each step in the flow diagram is carried out under the control of the controller 202.

Figure 5:
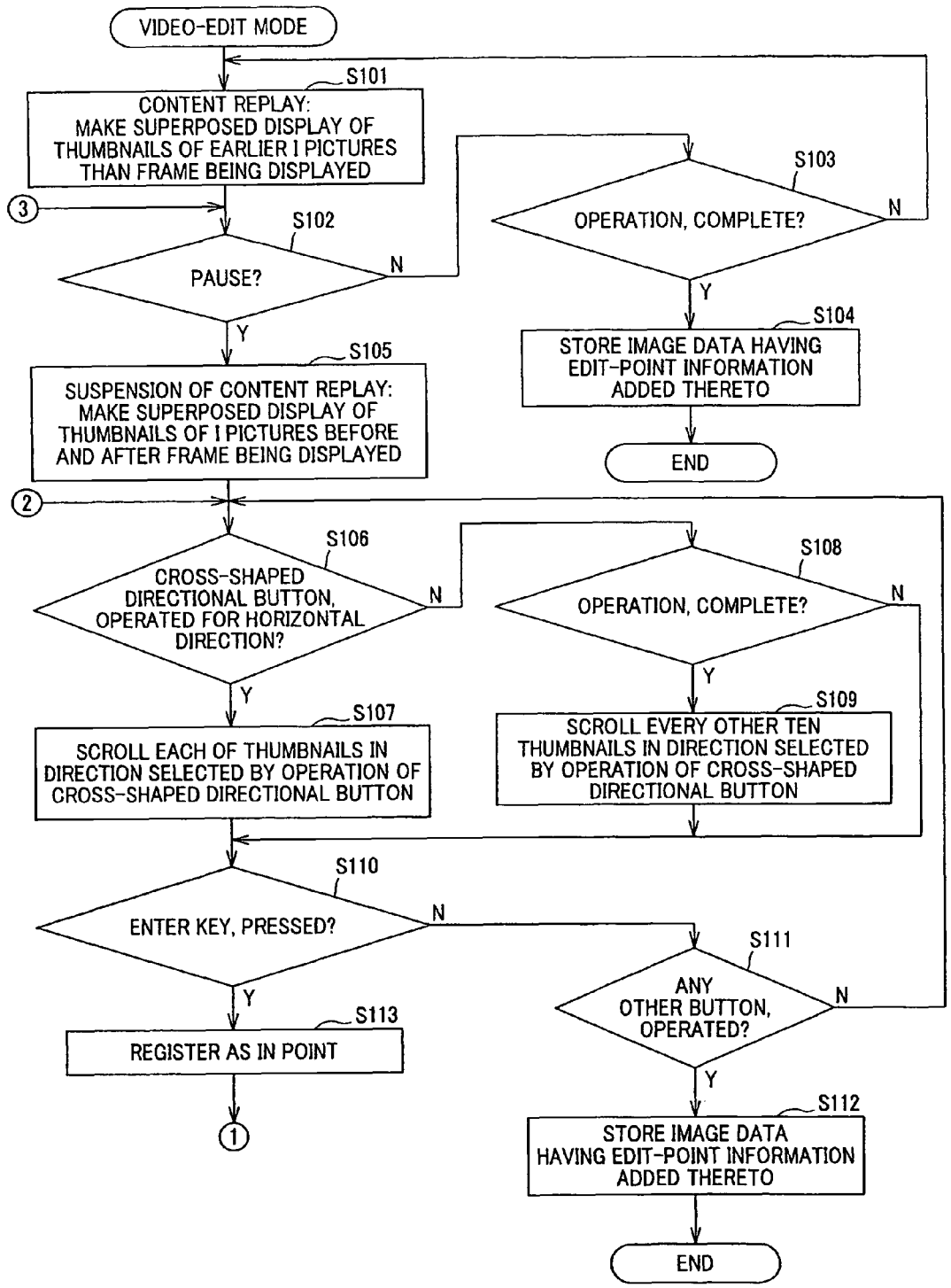
FIG. 5 shows a part of the flow of operations made in the substantial portion of the embodiment of the moving picture data editor according to the present invention.

The flow diagram in FIG. 5 starts when the edit mode is selected in the multimedia recorder/player 20 and further the replay-edit mode is selected.

More specifically, when a content to be edited is selected in the replay-edit mode and a command for starting the replay is entered, the controller 202 will read data in the content to be edited from the data storage unit 216, decodes the content data by the data decoder 208 and supplies the decoded data to the monitor display 30 via the display image generation/output unit 211 and display interface 212. Thus, a reproduced image is displayed on the monitor display 30. At this time, the controller 202 will control the thumbnail generator 210 to generate thumbnails, sends a control command to the display image generation/output unit 211 to have the latter display a thumbnail array 300 on the reproduced image as in FIG. 3 (in step S101).

Next, the controller 202 judges whether a pause operation has been made by the user at the remote commander 50 (in step S102). When the controller 202 determines that no pause operation has been made, it will judge whether an operation for quitting the replay-edit mode has been made at the remote commander 50 (in step S103).

If the controller 202 determines in step S103 that the operation for quitting the replay-edit mode has been made, it will write, back to the data storage unit 216, video data having added thereto IN and OUT points as edit points having so far been set (in step S104). Thereafter, the controller 202 exits this operation routine. If the controller 202 determines in step S103 that the operation for quitting the replay-edit mode has not been made, it will go to step S101.

When the controller 202 determines in step S102 that the pause operation has been made, it will freeze the display of the content image being displayed on the spot, and the display image generation/output unit 211 will superpose, on the image, the thumbnail array 300 including the central area 301, past area 302 and future area 308 as shown in FIG. 4 (in step S105).

Next, the controller 202 judges whether the cross-shaped directional button 56 on the remote commander 50 has been pressed at the horizontal-directional portion thereof (in step S106). When the controller 202 determines that the horizontal-directional portion of the directional button 56 has been pressed, it will control the display image generation/output unit 211 to scroll the thumbnails one by one in the direction designed by the horizontal-directional portion of the directional button 56 (in step S107).

Then, the controller 202 judges when the enter button has been pressed (in step S110). If the controller 202 determines that the enter button has not been pressed, it will judge whether an operation for quitting the replay-edit mode has been done at the remote commander 50 (in step S111).

If the controller 202 determines in step S111 that the operation for quitting the replay-edit mode has been done, it will write, back to the data storage unit 216, video data having added thereto IN and OUT points as edit points having so far been set (in step S112). Thereafter, the controller 202 exits this operation routine. If the controller 202 determines in step S111 that the operation for quitting the replay-edit mode has not been made, it will go back to step S106.

If the controller 202 determines in step S106 that the cross-shaped directional button 56 on the remote commander 50 has not been pressed at the horizontal-direction portion thereof, it will judge whether the L-button or R-button has been pressed at the remote commander 50 (in step S108). When the controller 202 determines that the L- or R-button has been pressed, it will control the display image generation/output unit 211 to scroll the thumbnails at every 10 pieces in this embodiment in a direction corresponding to the pressed button (in step S109). Then, the controller 202 goes to step S110 where it will judge whether the enter button has been pressed.

If the controller 202 determines in step S108 that the L- or R-button on the remote commander 50 has not been pressed, it will go directly to step S110 where it will judge whether the enter button has been pressed.

When the controller 202 determines in step S110 that the enter button has been pressed, it will register, as IN point, the image position corresponding to the thumbnail displayed in the central area 301 at that time (in step S113).

Figure 6:
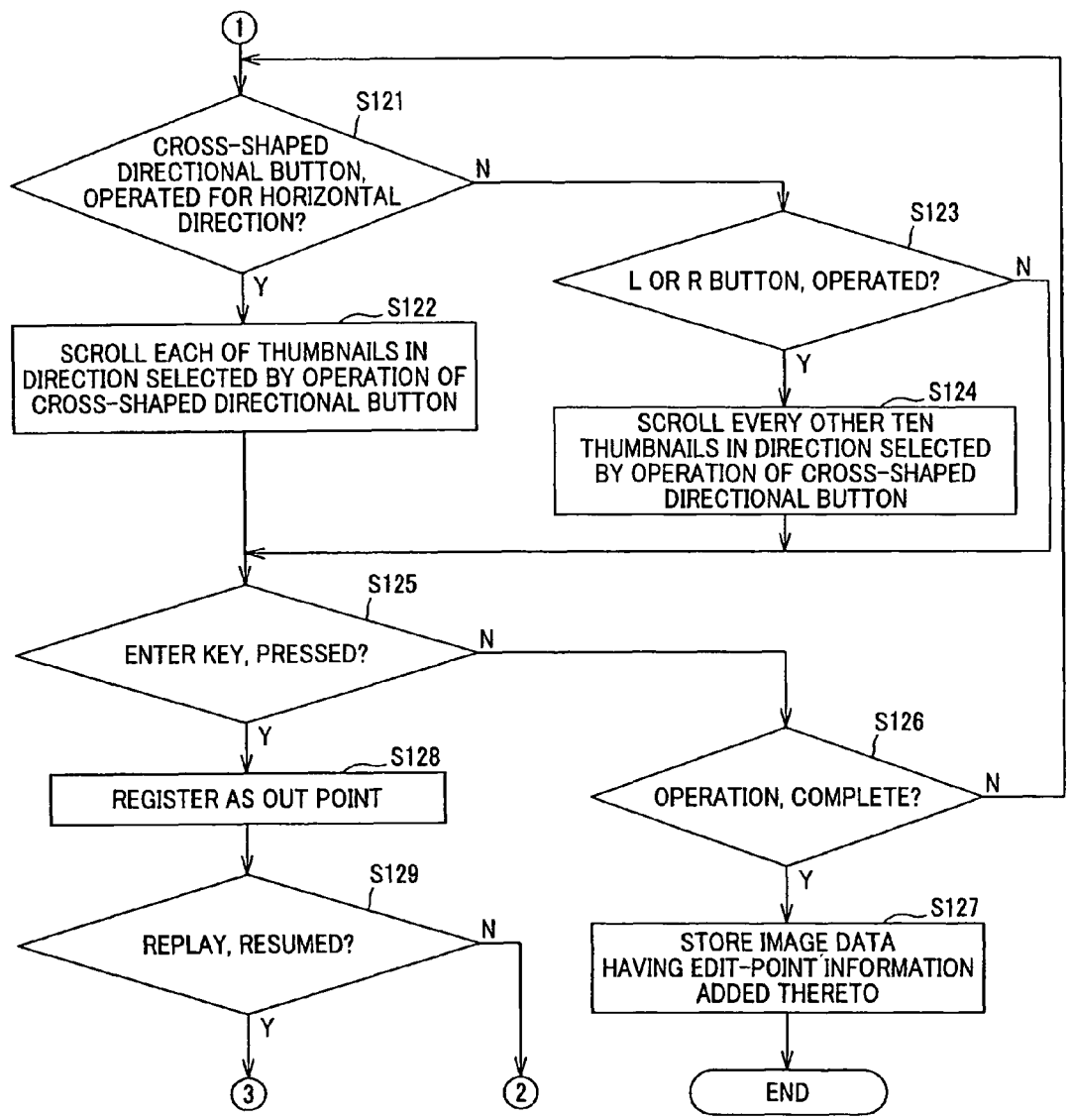
FIG. 6 also shows a part of the flow of operations made in the substantial portion of the embodiment of the moving picture data editor according to the present invention.

Next, the controller 202 judges whether the cross-shaped directional button 56 on the remote commander 50 has been pressed at the horizontal-directional portion thereof (in step S121 in FIG. 6). When the controller 202 determines that the horizontal-directional portion of the directional button 56 has been pressed, it will control the display image generation/output unit 211 to scroll the thumbnails one by one in the direction designed by the horizontal-directional portion of the directional button 56 (in step S122).

Then, the controller 202 judges when the enter button has been pressed (in step S125). If the controller 202 determines that the enter button has not been pressed, it will judge whether an operation for quitting the replay-edit mode has been done at the remote commander 50 (in step S126).

If the controller 202 determines in step S126 that the operation for quitting the replay-edit mode has been done, it will write, back to the data storage unit 216, video data having added thereto IN and OUT points as edit points having so far been set (in step S127). Thereafter, the controller 202 exits this operation routine. If the controller 202 determines in step S126 that the operation for quitting the replay-edit mode has not been made, it will go back to step S121.

If the controller 202 determines in step S121 that the cross-shaped directional button 56 on the remote commander 50 has not been pressed at the horizontal-direction portion thereof, it will judge whether the L-button or R-button has been pressed at the remote commander 50 (in step S123). When the controller 202 determines that the L- or R-button has been pressed, it will control the display image generation/output unit 211 to scroll the thumbnails at every 10 pieces in this embodiment in a direction corresponding to the pressed button (in step S124). Then, the controller 202 goes to step S125 where it will judge whether the enter button has been pressed.

If the controller 202 determines in step S123 that the L- or R-button on the remote commander 50 has not been pressed, it will go directly to step S125 where it will judge whether the enter button has been pressed.

When the controller 202 determines in step S125 that the enter button has been pressed, it will register, as OUT point, the image position corresponding to the thumbnail displayed in the central area 301 at that time (in step S128).

Then, the controller 202 judges whether an operation for resuming the replay at the point of pause has been done (in step S129). If the controller 202 determines that the replay-resuming operation has not been done, it will go back to step S106. When the controller 202 determines that the replay resuming operation has been done, it will go back to step S102 where it will wait for a next pause.

As having been described in the foregoing, the present invention permits to make alternate setting of IN and OUT points as edit points easily and elaborately.

In the foregoing, the present invention has been described in detail concerning a certain preferred embodiment thereof as an example with reference to the accompanying drawings. However, it should be understood by those ordinarily skilled in the art that the present invention is not limited to the embodiment but can be modified in various manners, constructed alternatively or embodied in various other forms without departing from the scope and spirit thereof as set forth and defined in the appended claims.

For example, the discrete thumbnails to be scrolled by operating the L- and R-buttons may include more or less pieces, not 10 pieces as above. Also, the discrete thumbnails may be different in number between the scrolling by the L-button and that by the R-button, that is, between the directions toward the past and future from the central area.

Also, thumbnails may be laid in a vertical array, not in a horizontal array as shown in FIGS. 3 and 4.

Note that although the button for displaying the user interface screen on which IN and OUT points are to be set is the pause button in the aforementioned embodiment, it is not limited to the pause button alone. Therefore, the background image on the user interface has not to be kept still as with the pause button but the replay may be continuously done.

Also, the embodiment having been described in the foregoing is the application of the present invention to the multimedia recorder/player. However, the present invention is not limited to the multimedia recorder/player but a single-medium player which can be addressed to a plurality of contents.

Further, in the aforementioned embodiment, the thumbnail array 300 is displayed horizontally on the display screen 32. However, the thumbnail array may be displayed vertically or obliquely.

In the aforementioned embodiment, a thumbnail of interest is displayed in the central area of the thumbnail array. However, For searching an earlier thumbnail than the thumbnail of interest, the latter may be displayed in the rightmost area. For searching a later thumbnail than the thumbnail of interest, the latter may be displayed in the leftmost area.

Also, in the aforementioned embodiment, the thumbnail of interest is displayed in a specific area such as the central area by horizontal scrolling and the thumbnail is select by operating the enter button. However, a selected thumbnail may be set with definite set commands from the user with respect to individual thumbnails.

Note that although the player in the aforementioned embodiment has no display, it may be provided with a display.

Also, in the aforementioned embodiment, for a replay in the edition mode, the aforementioned edit-point setting user interface is displayed. However, the edition mode may be set and the edit-point setting user interface may be displayed when a predetermined command is entered in a normal replay, not during replay in the edition mode.

Also, in the aforementioned embodiment, the thumbnails are laid in a linear array. However, they may be laid in a circular or curvilinear array.

What is claimed is:

1. A multisystem network comprising:
   a command input unit that accepts operation commands entered by the user;
   a storage unit that stores moving picture data;
   a decoding means for decoding the moving picture data read from the storage unit into display image data;
   a thumbnail generating means for generating a thumbnail of a portion, appearing at every predetermined time, of an image formed from the moving picture data;
   a display image generation/output unit that (a) outputs the display image data from the decoding means to a display unit, and reproduces the image on the display unit in a reproduction mode, and (b) when an edit operation is input via the command input unit, generates and outputs image data so that on the screen of the display unit (1) the reproduced image is display, (2) a thumbnail of the reproduced image is displayed superimposed on the reproduced image and (3) a plurality of thumbnails preceding and/or proceeding frames within a predetermined time interval of the reproduced image are displayed superimposed on the reproduced image; and
   a means for adding during the edit mode, to the moving picture data, information on edit points indicating image data positions corresponding to ones, designated by the command input unit, of the plurality of thumbnails displayed on the screen of the display unit, and for storing the image data positions into the storage unit, wherein the edit points are for editing of the moving picture data.

2. The multisystem network according to claim 1, wherein:
   before stored in the storage unit, the moving picture data has been subjected to motion compensation and divided into image groups each of a plurality of images and at least one image in one image group has been compressed with an image compression technique of providing a complete image in one screen; and
   the thumbnail generating means generates the thumbnail by minifying the image, compressed with the image compression technique of providing the complete image in one screen, in each image group of the compressed moving picture data.

3. The multisystem network according to claim 1, wherein the edit operation input by the command input unit is to enter a command for starting edit-point setting by the command input unit while the reproduced image is being displayed on the screen of the display unit.

4. The multisystem network according to claim 3, wherein the plurality of thumbnails displayed when the operation for setting edit points has been done are a thumbnail of a reproduced image being displayed on the screen of the display unit and thumbnails of images before and after the reproduced image being displayed.

5. The multisystem network according to claim 4, wherein the display image generation/output unit operates to:
   set the plurality of thumbnails in a linear or curvilinear array on the screen of the display unit; and
   generate an image in which the plurality of thumbnails displayed on the screen of the display unit is scrolled in a direction toward the past or future relative to a position of a reproduced image having been displayed on the screen of the display unit when the command for starting the edit-point setting was entered and corresponding to a directional command entered from the command input unit.

6. The multisystem network according to claim 5, wherein of the plurality of thumbnails displayed on the screen of the display unit, one in a predetermined fixed position on the screen is taken as a thumbnail of interest selected for setting the edit points.

7. The multisystem network according to claim 5, wherein:
   in response to a first command entered by the command input unit, the thumbnails are scrolled one by one; and
   in response to a second command entered by the command input unit, the thumbnails are scrolled at every several pieces.

8. The multisystem network according to claim 7, wherein the command input unit is a video game controller and the first and second command input buttons are assigned to predetermined buttons, respectively, on the video game controller.

9. The multisystem network according to claim 1, wherein the edit operation input by the command input unit is to enter a command for starting edit-point setting by the command input unit while the reproduced image is being displayed on the screen of the display unit in the edition mode.

10. The multisystem network according to claim 9, wherein the edit operation input by the command input unit is to suspend the replay.

11. The multisystem network according to claim 1, wherein the edit points are start and end points of an image portion which is not to be reproduced.

12. A moving picture data editing method, comprising:
   a reproduction step in which moving picture data read from a storage unit is decoded and displayed on a display screen as a reproduced image;
   a thumbnail superposed-displaying step in which when an edit operation is input by a command input unit during the reproduction step, on the display screen (1) the reproduced image is displayed, (2) a thumbnail of the reproduced image is displayed superimposed on the reproduced image and (3) a plurality of thumbnails preceding and/or proceeding within a predetermined time interval of the reproduced image are displayed superimposed on the reproduced image; and
   a step in which information on edit points indicating image data positions corresponding to ones, designated by the command input unit, of the plurality of thumbnails displayed on the screen of the display unit in the thumbnail superposed displaying step is added to the moving picture data and the image data positions into the storage unit during the edit mode, wherein the edit points are for editing of the moving picture data.

13. The method according to claim 12, wherein:
   before stored in the storage unit, the moving picture data has been subjected to motion compensation and divided into image groups each of a plurality of images and at least one image in one image group has been compressed with an image compression technique of providing a complete image in one screen; and the thumbnail is an image formed by minifying the image, compressed with the image compression technique of providing the complete image in one screen, in each image group of the compressed moving picture data.

14. The method according to claim 12, wherein the edit operation input by the command input unit is to enter a command for starting edit-point setting by the command input unit while the reproduced image is being displayed on the screen of the display unit.

15. The method according to claim 14, wherein the plurality of thumbnails displayed when the operation for setting edit points has been done are a thumbnail of a reproduced image being displayed on the screen of the display unit and thumbnails of images before and after the reproduced image being displayed.

16. The method according to claim 15, further comprising a step of:

setting the plurality of thumbnails in a linear or curvilinear array on the screen of the display unit; and generating an image in which the plurality of thumbnails displayed on the screen of the display unit is scrolled in a direction toward the past or future relative to a position of a reproduced image having been displayed on the screen of the display unit when the command for starting the edit-point setting was entered and corresponding to a directional command entered from the command input unit.

17. The method according to claim 16, wherein of the plurality of thumbnails displayed on the screen of the display unit, one in a predetermined fixed position on the screen is taken as a thumbnail of interest selected for setting the edit points.

18. The method according to claim 16, wherein:

in response to a first command entered by the command input unit, the thumbnails are scrolled one by one; and in response to a second command entered by the command input unit, the thumbnails are scrolled at every several pieces.

19. The method according to claim 18, wherein the command input unit is a video game controller and the first and second command input buttons are assigned to predetermined buttons, respectively, on the video game controller.

20. The method according to claim 12, wherein the edit operation input by the command input unit is to enter a command for starting edit-point setting by the command input unit while the reproduced image is being displayed on the screen of the display unit in the edition mode.

21. The method according to claim 20, wherein the edit operation input by the command input unit is to suspend the replay.

22. The method according to claim 12, wherein the edit points are start and end points of an image portion which is not to be reproduced.

23. A multisystem network comprising:

a command input unit that accepts operation commands entered by the user;

a storage unit that stores moving picture data;

a decoder for decoding the moving picture data read from the storage unit into display image data;

a thumbnail generator for generating a thumbnail of a portion, appearing at every predetermined time, of an image formed from the moving picture data;

a display image generation/output unit that (a) outputs the display image data from the decoder to a display unit, and reproduces the image on the display unit in a reproduction mode, and (b) when an edit operation is input, generates and outputs image data so that on the display unit (1) a reproduced image is displayed, (2) a thumbnail of the reproduced image is displayed superimposed on the reproduced image displayed on the display unit and (3) a plurality of thumbnails preceding and/or proceeding frames within a predetermined time interval of the reproduced image are displayed superimposed on the reproduced image displayed on the display unit; and a unit for adding during the edit mode, to the moving picture data, information on edit points indicating image data positions corresponding to ones, designated by the command input unit, of the plurality of thumbnails displayed on the screen of the display unit, and storing the image data positions into the storage unit, wherein the edit points are for editing of the moving picture data.

24. A multisystem network comprising:

a command input unit that accepts operation commands entered by a user;

a storage unit that stores moving picture data;

a decoding means for decoding the moving picture data read from the storage unit into display image data;

a thumbnail generating means for generating a thumbnail of a portion, appearing at every predetermined time, of an image formed from the moving picture data;

a display image generation/output unit that (a) in a reproduction mode, outputs the display image data from the decoding means to a display unit, and reproduces the image on the display unit, and (b) in an edit mode for selecting a portion of the moving picture data which is not to be reproduced, generates an edit-point interface screen displayed on the display unit, the interface screen prompting the user to set one of a start edit point to stop reproduction and an end edit point to re-start reproduction, wherein the interface screen displaying a message to the user indicating which edit point is to be set next.

25. The multisystem network according to claim 24 wherein the display image generation/output unit in the edit mode generates data so that a thumbnail of the reproduced image being displayed on the interface screen of the display unit and a plurality of thumbnails near the reproduced image are displayed being superposed on the reproduced image.

26. The multisystem network according to claim 25, wherein the display image generation/output unit operates to:

set the plurality of thumbnails in a linear or curvilinear array on the screen of the display unit; and generate an image in which the plurality of thumbnails displayed on the screen of the display unit is scrolled in a direction toward the past or future relative to a position of a reproduced image having been displayed on the screen of the display unit when the command for starting the edit-point setting was entered and corresponding to a directional command entered from the command input unit.

27. The multisystem network according to claim 26, wherein of the plurality of thumbnails displayed on the screen of the display unit, one in a predetermined fixed position on the screen is taken as a thumbnail of interest selected for setting the edit points.

28. The multisystem network according to claim 26, wherein:

in response to a first command entered by the command input unit, the thumbnails are scrolled one by one; and in response to a second command entered by the command input unit, the thumbnails are scrolled at every several pieces.

29. The multisystem network according to claim 28, wherein the command input unit is a video game controller and the first and second command input buttons are assigned to predetermined buttons, respectively, on the video game controller.

30. The multisystem network according to claim 24 further comprising a means for adding during the edit mode, to the moving picture data, information on edit points indicating image data positions corresponding to ones, designated by the command input unit, of the plurality of thumbnails displayed on the screen of the display unit, and for storing the image data positions into the storage unit, wherein the edit points are for editing of the moving replay.

31. The multisystem network according to claim 24, wherein the edit points are start and end point of an image portion which is not to be reproduced.

\* \* \* \* \*